(12) United States Patent
Chen et al.

(10) Patent No.: US 8,883,870 B2
(45) Date of Patent: Nov. 11, 2014

(54) PROPYLENE-ALPHA-OLEFIN COPOLYMER COMPOSITIONS WITH IMPROVED FOAMING WINDOW

(75) Inventors: Yong Chen, Shanghai (CN); Morgan M. Hughes, Angleton, TX (US); Ho Jin Chee, Yongin (KR); Takahiko Ohmura, Kanagawa-Ken (JP)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/823,464

(22) PCT Filed: Sep. 15, 2010

(86) PCT No.: PCT/CN2010/076935
§ 371 (c)(1),
(2), (4) Date: Jun. 11, 2013

(87) PCT Pub. No.: WO2012/034272
PCT Pub. Date: Mar. 22, 2012

(65) Prior Publication Data
US 2013/0303642 A1 Nov. 14, 2013

(51) Int. Cl.
*C08J 9/00* (2006.01)
*C08K 5/00* (2006.01)
*C08L 23/14* (2006.01)
*C08K 5/43* (2006.01)
*C08J 9/10* (2006.01)
*C08J 9/06* (2006.01)

(52) U.S. Cl.
CPC .............. *C08J 9/0033* (2013.01); *C08J 9/0028* (2013.01); *C08K 5/005* (2013.01); *C08L 23/142* (2013.01); *C08K 5/43* (2013.01); *C08J 9/104* (2013.01); *C08J 9/06* (2013.01)
USPC .............................................. 521/88; 521/50

(58) Field of Classification Search
CPC ................................ C08J 9/0033; C08J 9/0028
USPC .......................................................... 521/88
See application file for complete search history.

(56) References Cited

U.S. PATENT DOCUMENTS

| | | | |
|---|---|---|---|
| 5,118,531 A * | 6/1992 | Petersen et al. ................ | 427/230 |
| 5,504,172 A | 4/1996 | Imuta et al. | |
| 6,512,019 B1 | 1/2003 | Agarwal et al. | |
| 6,525,157 B2 | 2/2003 | Cozewith et al. | |
| 6,649,666 B1 * | 11/2003 | Read et al. ....................... | 521/95 |
| 6,776,924 B2 | 8/2004 | Walters et al. | |
| 6,960,635 B2 | 11/2005 | Stevens et al. | |
| 7,300,960 B2 | 11/2007 | Wada | |
| 7,399,808 B2 * | 7/2008 | Walters et al. ............. | 525/333.7 |
| 7,671,137 B2 | 3/2010 | Kushida | |
| 2003/0138627 A1 | 7/2003 | Finlayson et al. | |
| 2005/0113473 A1 | 5/2005 | Wada | |
| 2007/0208140 A1 | 9/2007 | Wada | |
| 2009/0093594 A1 | 4/2009 | Kushida | |
| 2012/0108134 A1 * | 5/2012 | Chee et al. .................... | 442/370 |

FOREIGN PATENT DOCUMENTS

| | | |
|---|---|---|
| WO | 99/10425 A1 | 3/1999 |
| WO | 99/10427 A1 | 3/1999 |
| WO | 00/01745 | 1/2000 |
| WO | 02/32985 | 4/2002 |

OTHER PUBLICATIONS

International Search Report and Written Opinion of PCT/CN2010/076935 mailed Jun. 6, 2011.

* cited by examiner

*Primary Examiner* — Hui Chin
(74) *Attorney, Agent, or Firm* — Whyte Hirschboeck Dudek S.C.

(57) ABSTRACT

The foaming window for making a foam useful in the manufacture of artificial leather is expanded through the use of a foamable composition comprising (A) a propylene-α-olefin copolymer, (B) a molecular melt (MM) comprising 4,4'-oxydibenzenesulfonylazide (DPO-BSA) and an antioxidant, and (C) a blowing agent. The foaming window can be expanded such that foaming can occur at 220° C. for 20 to 200 or more seconds.

8 Claims, 2 Drawing Sheets

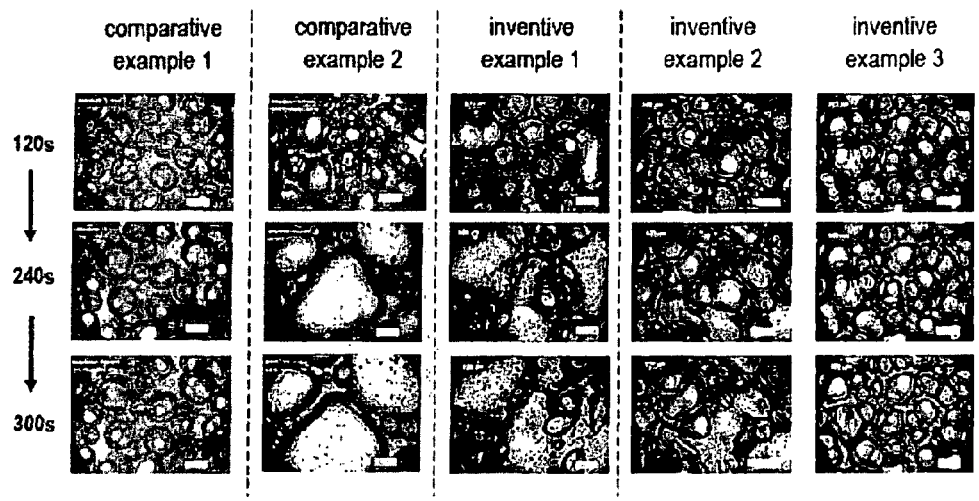
Figure 1. Foaming property of the comparative and inventive examples. (scale bar: 200 microns)
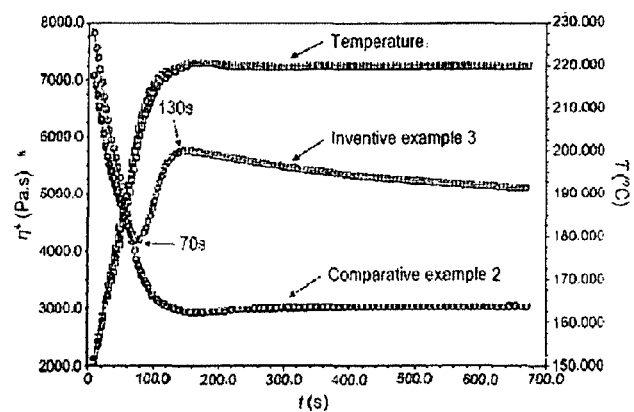
Figure 2. Variation of melt viscosity in the foaming process for the comparative sample 2 and the inventive sample 3.
Test condition: strain 5%; angular frequency 6.28 rad/s.

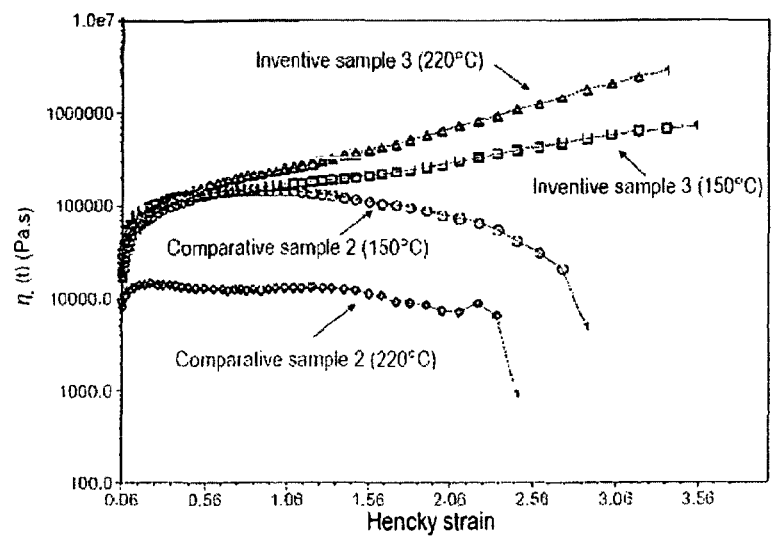
Figure 3. Elongation viscosity of comparative sample 2 and inventive sample 3 measured at 150°C and 220°C with strain rate 0.1 s$^{-1}$.

PROPYLENE-ALPHA-OLEFIN COPOLYMER COMPOSITIONS WITH IMPROVED FOAMING WINDOW

CROSS REFERENCE TO RELATED APPLICATION

The present application is the national phase of PCT Patent Application No. PCT/CN2010/076935 filed Sep. 15, 2010, the entire content of which is incorporated by reference herein.

BACKGROUND OF THE INVENTION

1. Field of the Invention

This invention relates to propylene-alpha-olefin copolymer compositions. In one aspect the invention relates to foamable propylene-α-olefin copolymer compositions while in another aspect, the invention relates to a process of foaming such compositions under restricted conditions. In still another aspect the invention relates to compositions designed for use in the manufacture of artificial leather.

2. Description of the Related Art

Propylene-α-olefin copolymers can be successfully used in existing polyvinyl chloride (PVC) artificial leather production lines, and to prepare foamed synthetic leathers with satisfactory mechanical and haptic performance for artificial leather markets such as sporting goods (bags, gloves, tarpaulin and balls etc.) and shoe uppers. Representative of this technology is PCT/US2010/035256.

Production of artificial leather is a continuous process, and certain steps such as compounding, calendaring and lamination, require a processing temperature of about 150° C., to prevent pre-foaming of blowing agents, followed by foaming at a temperature of about 220° C. for 30 to 200 seconds (s) (the "foaming window"). Although numerous propylene-α-olefin copolymer formulations have been developed, some exhibit a narrower foaming window (less than (<) 120 s at 220° C.) than required for existing PVC lines (30-200 s at 220° C.), i.e., the foam structure is destroyed after a longer time of foaming (greater than (>) 120 s) at a foaming temperature of 220° C. Incorporation of 20-50 weight percent (wt %) or more styrene-ethylene-butylene-styrene (SEBS) block elastomer into the formulation provides the desired foaming performance, including the required foaming window and final product performance, but the costs of the operation are greatly increased.

As such an interest exists in developing a composition for artificial leather applications which has good foam stability, is cost effective (does not require SEBS or use less amount of SEBS), and offers a wider foaming window (>120 s at 220° C.) without sacrificing the processability for compounding, calendaring and lamination, as well as performance of the final products.

SUMMARY OF THE INVENTION

In one embodiment the invention is a foamable composition comprising (A) a propylene-α-olefin copolymer, (B) a molecular melt (MM) comprising 4,4'-oxydibenzenesulfonylazide (DPO-BSA) and an antioxidant, and (C) a blowing agent. In one embodiment the foamable composition comprises at least 300 parts per million (ppm) DPO-BSA. In one embodiment the foamable composition further comprises one or more (i) polymers other than the propylene-α-olefin copolymer, (ii) foaming additives, (iii) fillers, and (iv) processing aids.

In one embodiment the invention is a process for preparing a foam, the process comprising the steps of: (A) blending a DPO-BSA molecular melt, blowing agent, propylene-α-olefin copolymer and other ingredients, if any; (B) compounding the blend at a temperature at which the copolymer is melted but neither the blowing agent nor DPO-BSA are activated, and (C) raising the temperature of the composition such that the blowing agent and DPO-BSA are activated sufficient to foam the composition. The components of the composition can be mixed by any one of a number of different methods, e.g., dry blending using conventional equipment and techniques, or melt blending using an extruder.

The inventive technology affords a wide foaming window and better foam stability (more than 200 s at 220° C.) without the use of SEBS. The foamable composition is a cost effective and has no influence on material processability during compounding, calendaring and lamination process in making artificial leather products.

The invention comprises the following embodiments:

1. A foamable composition comprising (A) a propylene-α-olefin copolymer, (B) a molecular melt (MM) comprising 4,4'-oxydi-benzenesulfonylazide (DPO-BSA) and an antioxidant, and (C) a blowing agent.

2. The foamable composition of embodiment 1 in which the propylene-α-olefin copolymer has substantially isotactic propylene sequences.

3. The foamable composition of any one of embodiments 1-2 in which the propylene-α-olefin copolymer has a melt flow rate of 0.1 to 25 g/10 min, a molecular weight distribution of 3.5 or less, and the α-olefin is ethylene.

4. The foamable composition of any one of embodiments 1-3 in which the propylene-α-olefin copolymer is present in an amount of 5 to 95 weight percent based on the weight of the composition, and the molecular melt is present in an amount of 200 to 3,000 ppm and the blowing agent is present in an amount of 1 to 30 weight percent, both based upon the weight of the propylene-α-olefin copolymer.

5. The foamable composition of any one of embodiments 1-4 in which the antioxidant is a hindered phenolic compound that does not contain phosphite containing a phosphorus atom in the +3 oxidation state, and the DPO-BSA and antioxidant are present in the molecular melt at mole ratio of 1:10 to 10:1.

6. The foamable composition of any one of embodiments 1-5 in which the molecular melt comprises one or more of an internal lubricant, stabilizing agent, release agent, plasticizer, ultra-violet stabilizer and catalyst neutralizer.

7. The foamable composition of any one of embodiments 1-6 in which the blowing agent is azodicarbonamide.

8. A process for preparing a foam, the process comprising the steps of: (A) blending a DPO-BSA molecular melt, blowing agent, and propylene-α-olefin copolymer; (B) compounding the blend at a temperature at which the copolymer is melted but neither the blowing agent nor DPO-BSA are activated, and (C) raising the temperature of the composition such that the blowing agent and DPO-BSA are activated sufficient to foam the composition.

9. The process of embodiment 8 in which the blending and compounding steps are conducted at a temperature of 150° C. or less, and the foaming step of (C) is conducted at a temperature above 150° C. but less than 220° C.

10. Artificial leather comprising foam made by the process of embodiment 8 or 9.

BRIEF DESCRIPTION OF THE DRAWINGS

FIG. 1 is a series of micrographs showing the foaming properties of the comparative and inventive examples.

FIG. 2 is a graph reporting the variation of melt viscosity in the foaming process of Comparative Sample 2 and Inventive Samples 3.

FIG. 3 is a graph reporting elongation viscosity of Sample 2 measured at 150° C. and 220° C. at a strain rate of 0.1 s$^{-1}$.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of various components of the composition, the parameters of the process, and the like.

"Molecular melt" and like terms mean an at least partially amorphous blend, at room temperature, of DPO-BSA and an antioxidant, optionally also containing other polymer additives. Both the DPO-BSA and the antioxidant are at least partially contained in the amorphous phase of the blend. Also, preferably the DPO-BSA and the antioxidant form a complex where the Raman spectra relating to the groups forming the nitrene groups are shifted compared to the Raman spectra exhibited by the groups forming the nitrene groups of the DPO-BSA alone. These shifts are illustrated in FIGS. 1A and 1B of U.S. Pat. No. 6,776,924.

"Antioxidant" and like terms mean types or classes of chemical compounds that are capable of being used to minimize the oxidation that can occur during the processing of polymers. The term also includes chemical derivatives of the antioxidants, including hydrocarbyls. The term further includes chemical compounds, as described later in the description of the antioxidant, that when properly combined with DPO-BSA, interact with it to form a complex which exhibits a modified Raman spectra compared to the DPO-BSA alone.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Interpolymer", "copolymer" and like terms means a polymer prepared by the polymerization of at least two different types of monomers. These generic terms refer both to polymers prepared from two different types of monomers, and polymers prepared from more than two different types of monomers, e.g., terpolymers, tetrapolymers, etc.

"Calendering" and like terms mean, in the context of this invention, a mechanical process in which a molten polymer is converted into a sheet by passing the molten polymer through a series of rollers to coalesce, flatten and smooth the polymer into a sheet or film.

"Laminating" and like terms mean a process in which a film, typically of plastic or like material, is applied to a substrate which can be another film. The film can be applied to the substrate with or without an adhesive. If without an adhesive, the film and/or substrate can be heated to promote heat or melt lamination. Laminations are products of a laminating process, and these products are multilayered, i.e., they comprise at least two layers, a film layer in contact with a base or substrate layer.

"Foam" and like terms mean a substance that is formed by trapping many gas bubbles in a liquid or solid.

Propylene-α-Olefin

In one embodiment the propylene-α-olefin copolymer is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, both of which refer to the isotactic sequence in terms of a triad unit in the copolymer molecular chain determined by $^{13}$C NMR spectra.

The propylene-α-olefin copolymer may have a melt flow rate (MFR) in the range of from 0.1 to 25 g/10 minutes (g/10 min), measured in accordance with ASTM D-1238 (at 230° C./2.16 Kg). All individual values and subranges from 0.1 to 25 g/10 min are included and disclosed by this range; for example, the MFR can be from a lower limit of 0.1 g/10 min, 0.2 g/10 min, or 0.5 g/10 min to an upper limit of 25 g/10 min, 15 g/10 min, 10 g/10 min, 8 g/10 min, or 5 g/10 min. For example, the propylene-α-olefin copolymer may have a MFR in the range of 0.1 to 10 g/10 min; or the propylene/alpha-olefin copolymer may have a MFR in the range of 0.2 to 10 g/10 min.

The propylene-α-olefin copolymer comprises units derived from propylene and one or more alpha-olefin comonomers. Exemplary comonomers utilized to manufacture the propylene/alpha-olefin copolymer are $C_2$ and $C_4$ to $C_{10}$ alpha-olefins; for example, $C_2$, $C_4$, $C_6$ and $C_8$ alpha-olefins. The propylene-α-olefin copolymer comprises from 1 to 30 wt % of one or more units derived from one or more alpha-olefin comonomers. Ethylene is a preferred comonomer.

The propylene-α-olefin copolymer has a molecular weight distribution (MWD), defined as weight average molecular weight divided by number average molecular weight ($M_w/M_n$) of 3.5 or less; or 3.0 or less; or from 1.8 to 3.0.

Such propylene-α-olefin copolymers are further described in the U.S. Pat. Nos. 6,960,635 and 6,525,157. Such propylene-α-olefin copolymers are commercially available from The Dow Chemical Company under the trade name VERSIFY or from ExxonMobil Chemical Company under the trade name VISTAMAXX.

The foamable composition can comprise one or two or more propylene-α-olefin copolymers. The propylene-α-olefin copolymer or copolymers can also be admixed with one or more other polymers. For example, the propylene-α-olefin copolymer can be admixed with one or more random propylene polymers and/or an ethylene-α-olefin copolymer. The random propylene polymers typically comprise 90 or more mole percent units derived from propylene. The remainder of the units in the propylene copolymer is derived from units of at least one α-olefin. The α-olefin component of the propylene copolymer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative random propylene copolymers include but are not limited to propylene/ethylene, propylene/1-butene, propylene/1-hexene, propylene/1-octene, and the like. Illustrative terpolymers include ethylene/propylene/1-octene, ethylene/propylene/1-butene, and ethylene/propylene/diene monomer (EPDM).

If the propylene-α-olefin copolymer of the foamable composition is admixed with one or more other polymers to form propylene-α-olefin copolymer component, then the propylene-α-olefin copolymer (or copolymers) comprises at least 50, 60, 70, 80 or 90 weight percent of the component.

The minimum amount of propylene-α-olefin copolymer in the foamable composition (whether a single propylene-α-olefin copolymer, or two or more propylene-α-olefin copolymers, or one or more propylene-α-olefin copolymers in combination with one or more other polymers) can vary, but typically the minimum amount of propylene-α-olefin copolymer in the composition is 5, more typically 20 and even more typically 40, percent by weight (wt %) of the composition. The maximum amount of propylene-α-olefin copolymer in the composition can also vary, but typically it does not exceed 95, more typically it does not exceed 90 and even more typically it does not exceed 85, wt % of the composition.

Molecular Melt

Molecular melts are know and are well described in U.S. Pat. No. 6,776,924. The molecular melt is at least partially amorphous which imparts to it an improved ability to phlagmatize the DPO-BSA. This amorphous nature also improves the efficiency of the foaming process.

The molecular melt comprises DPO-BSA and an antioxidant. Typically at least a portion of the DPO-BSA and antioxidant form a complex which does not adversely interfere with the utilization of the DPO-BSA for foaming the propylene-α-olefin copolymers.

The antioxidants used in the practice of this invention include chemicals that are useful as antioxidants for polymers and chemical derivatives of such antioxidants, including hydrocarbyls.

The antioxidants that can be utilized in the invention also include chemical compounds that can form a complex with DPO-BSA and which does not adversely interfere with the utilization of blowing agent for foaming polymers.

Preferably, but not necessarily, the chemical compounds utilized for the antioxidant in the practice of this invention are capable of acting as antioxidants when the molecular melt is added to the propylene-α-olefin copolymer.

The antioxidants preferably have the capability of existing in an amorphous state. The antioxidant is preferably more soluble in the propylene-α-olefin copolymer than DPO-BSA at the typical processing conditions present during the foaming of the propylene-α-olefin copolymer. Also, the antioxidant should be chemically and sterically compatible with DPO-BSA so as to form a partially amorphous molecular melt in which the reactive groups of DPO-BSA do not appreciably adversely react with the antioxidant.

Examples of classes of antioxidants that can be utilized in the invention include compounds which can function as either carbon radical and/or oxygen radical scavengers, such as phenolic compounds and their derivatives, hindered amines, amine hydroxides, thioester compounds, and hindered phenolic compounds. Additionally, lactones, which can function as both carbon radical scavengers and oxygen radical scavengers, are also included within the antioxidants that can be utilized in the practice of this invention. In some instances the molecular melt preferably contains a mixture of antioxidants. As an example of a lactone suitable for use in the practice of this invention is the reaction products of 5,7-bis(1,1-dimethylethyl)-3-hydroxy-2(3H)-benzofuranone with o-xylene (Chemical Abstracts #181314-48-7), which is sold by the Ciba Specialty Chemicals Company, under the trade name IRGANOX HP-136.

The phenolic-based antioxidants and their derivatives and the lactones are preferred antioxidants. Examples of phenolic-based antioxidants and substituted phenolic-based antioxidants include 2,2'-methylene bis(6-(1-methylcyclohexyl)-p-cresol and 2,6-ditertiary butyl-4-methyl phenol. These classes of antioxidants are capable of forming highly amorphous (less than 10% crystallinity) molecular melts and are also capable of forming molecular melts having a high molar ratio of DPO-BSA to antioxidant (greater than 1:1). More preferably, the hindered phenolic compounds are utilized to form the molecular melt. As an example of a hindered phenolic compound suitable for use in the practice of this invention is tetrakis [methylene (3,5-di-t-butyl-4-hydroxyhydrocinnamate)] which is available from the Ciba Specialty Chemicals Company under the trade name IRGANOX 1010 (sometimes referred to as "I-1010").

The mole ratio of DPO-BSA to antioxidant in the molecular melt is typically from 1:10 to 10:1, preferably from 1:2 to 8:1, more preferably from 1:4 to 4:1. The overall crystallinity of the molecular melt is typically related to the mole ratio of DPO-BSA to antioxidant. In most instances the ratio of DPO-BSA to antioxidant in the molecular melt is adjusted to provide a molecular melt having a total crystallinity of 99 weighted average weight percent or below (as determined by DSC and calculated as set forth in Example 2 of U.S. Pat. No. 6,776,924), more preferably less than 95 weighted average weight percent, further more preferably less than 60 weighted average weight percent, most preferably less than 40 weighted average weight percent. In some instances, if there is particular concern regarding the shock sensitivity of the molecular melt, a molecular melt having a crystallinity of 20 weighted average weight percent or below, more preferably 10 weighted average weight percent or below, further more preferably 5 weighted average weight percent of below, most preferably 1 weighted average weight percent or below as determined by DSC. For a molecular melt comprised of 4,4'- oxydibenzenesulfonylazide and tetrakis[methylene (3,5-di-t-butyl-4-hydroxyhydrocinnamate)], the molar ratio of DPO-BSA to antioxidant is preferably between 1:2 and 4:1. In some instances, low melting polymer additives such as polyethylene glycol and/or polypropylene glycol may be included in the molecular melt. These types of compounds may reduce the crystallinity of the molecular melt and/or reduce the shock sensitivity of the molecular melt.

The molecular melt may be formed by melt blending the DPO-BSA and antioxidant, by co-precipitating the DPO-BSA and antioxidant from a common solvent, or any other method that will provide an at least partially amorphous molecular melt.

Other compounds, in addition to the DPO-BSA and antioxidant, may optionally be present in the molecular melt. Preferably, the additional compounds will not adversely react with either the DPO-BSA or the antioxidant and will not cause the crystallinity of the molecular melt to rise significantly. However, in some instances, for example, where blocking of the molecular melt is a concern, it may be desirable to add additional compounds which will increase the resulting crystallinity of the molecular melt. Low melting materials such as polyethylene glycol and polypropylene glycol may optionally be included in the molecular melt to lower the shock-sensitivity and/or crystallinity of the molecular melt. Preferable the molecular melt does not contain any phosphite-based compounds (such as phosphite-based antioxidants) as these phosphite-based compounds may adversely react with the DPO-BSA in the molecular melt. In general the additional compounds added to the molecular melt should be polymer additives that are typically added during the polymerization process or polymer processing process.

Nonlimiting examples of the additional compounds that may be present in the molecular melt include:
A. Internal lubricants, such as polyethylene glycol (PEG), polypropylene glycol (PPG), calcium stearate, zinc stearate, barium stearate, glycerol mono stearate (GMS);
B. Stabilizing agents, such as titanium di(dioctylpyrophosphosate)-oxyacetate, di(dioctylpyrophosphosate)ethylene titanate, Isopropyl tricumylphenyl titanate, Tetra(2, 2-diallyloxymethyl)butyl, di(ditridecyl)phosphio zirconate, glycidoxypropyl-trimethoxysilane;
C. Release agents, such as oleamide, stearamide, zinc stearate, erucamide, aminopropyltrimethoxysilane, bis (glycidoxypropyl)tetramethyldisiloxane, bis(3-(triethoxysilyl)propyl)-tetrasulfide, bis(trimethylsilyl) urea;
D. Plasticizers, such as, tri-isooctyl trimellitate, epoxidized soybean oil, paraffin oil, di(2-ethylhexyl)adipate, acetyl triethyl citrate, acetyl tributyl citrate, di-isocecyl adipate, triethyl citrate, polybutene, oleyl palitamide, N-stearyl erucamide, distearyl thiodipropionate;
E. Ultra-violet stabilizers, such as 2-hydroxy-4-n-octoxy-benzo-phenone; 2-hydroxy-4-methoxy-benzophenone; sodium dicyclohexyl sulfosuccinate;
F. Catalyst neutralizers, such as metal stearates (such as calcium stearate), hydrotalcites, calcium lactate, and metal oxides; and combinations thereof.

These optional components are used in known amounts and in known ways.

Compounds containing phosphorous in the +3 oxidation state may be added to the molecular melt in limited quantities that do not adversely react with DPO-BSA or antioxidant.

The molecular melt may be formed into any convenient form, solid or liquid. The molecular melt will typically be formed into particles that can be used in a process for foaming propylene-α-olefin copolymers, such as propylene-ethylene copolymers. The DPO-BSA is properly dispersed in the target polymer prior to or during reaction. To improve the dispersion of the DPO-BSA in the copolymer, the particle size can be modified according to the mole ratio of DPO-BSA to antioxidant in the molecular melt. The optimum particle size also depends on the process equipment used to mix the molecular melt with the copolymer. For example, for a molecular melt comprised of DPO-BSA and tetrakis[Methylene(3,5-di-t-butyl-4-hydroxyhydrocinnamate)] at a molar ratio of 1:1 in which a ZSK-40 co-rotating twin-screw extruder manufactured by Werner Pfleiderer Corporation is utilized, the average diameter of the particles of molecular melt is preferably 3000 microns or less, more preferably 2000 microns or less. For ease of processing and handling, the particles preferably have an average diameter of 200 microns although the average diameter can be larger or smaller than this size.

The minimum amount of DPO-BSA in the foamable composition can vary, but typically the minimum amount of DPO-BSA in the composition is 200, more typically 300 and even more typically 500, parts per million (ppm) based on the polymer content on the composition. The maximum amount of DPO-BSA in the composition can also vary, but typically it does not exceed 3,000, more typically it does not exceed 1,500 and even more typically it does not exceed 1,000, ppm of the polymer content of the composition.

Blowing Agent

Most any of the known blowing agents (also known as foaming or expansion agents) can be employed, including gaseous materials, volatile liquids and chemical agents which decompose into a gas and other byproducts. Representative blowing agents include, without limitation, nitrogen, carbon dioxide, air, methyl chloride, ethyl chloride, pentane, isopentane, perfluoromethane, chlorotrifluoromethane, dichlorodifluoromethane, trichlorofluoromethane, perfluoroethane, 1-chloro-1,1-difluoroethane, chloropentafluoro-ethane, dichlorotetrafluoroethane, trichlorotrifluoroethane, perfluoropropane, chlorohepta-fluoropropane, dichlorohexafluoropropane, perfluorobutane, chlorononafluorobutane, perfluorocyclobutane, azodicarbonamide (ADCA), azodiisobutyronitrile, benzenesulfon-hydrazide, 4,4-oxybenzene sulfonyl-semicarbazide, p-toluene sulfonyl semicarbazide, barium azodicarboxylate, N,N'dimethyl-N,N'-dinitrosoterephthalamide, and trihydrazino triazine. Currently, ADCA is a preferred blowing agent. The blowing agent can be used alone or in combination with one or more other blowing agents.

The minimum amount of blowing agent in the foamable composition can vary, but typically the minimum amount of blowing agent in the composition is 1, more typically 2 and even more typically 3, wt % of the polymer content on the composition. The maximum amount of blowing agent in the composition can also vary, but typically it does not exceed 30, more typically it does not exceed 20 and even more typically it does not exceed 10, wt % of the composition.

Foamable Composition

DPO-BSA MM can effectively crosslink the propylene-α-olefin copolymers (such as VERSIFY) at a foaming temperature such as 220° C. The foamable composition has enhanced melt strength, and thus significantly improved foam stability (>200 s) at high foaming temperatures, e.g., 220° C. Moreover, DPO-BSA MM has little reaction at 150° C., i.e., it does not affect material processability during the compounding, calendaring and lamination processes of artificial leather manufacture. The DPO-BSA MM is an odorless solid white powder, and it is quite stable for storage/transportation. It can be incorporated into the formulation, i.e., admixed with the propylene-α-olefin copolymer, directly and easily. The foamable composition of this invention can be used on existing PVC extrusion equipment without the need for expensive equipment changes or retrofits, and it affords a chlorine-free composition for artificial leather.

SPECIFIC EMBODIMENTS

Comparative Examples 1-2 and Inventive Examples 1-3

Foamable Compositions

Five foamable compositions are prepared, two comparative compositions and three inventive compositions. These compositions are reported in Table 1.

TABLE 1

Foamable Compositions

| Ingredients (phr) | Comparative Example 1 | Comparative Example 2 | Inventive Example 1 | Inventive Example 2 | Inventive Example 3 |
|---|---|---|---|---|---|
| VERSIFY 2300 | 0 | 35 | 35 | 35 | 35 |
| VERSIFY 2400 | 40 | 50 | 50 | 50 | 50 |
| VERSIFY 3401 | 40 | 0 | 0 | 0 | 0 |
| PROPYLENE R370Y | 0 | 15 | 15 | 15 | 15 |
| SEBS MD6945 | 20 | 0 | 0 | 0 | 0 |
| DPO-BSA (ppm) | 0 | 0 | 300 | 800 | 1500 |
| Zinc Stearate (SZ-210) | 0.4 | 0.4 | 0.4 | 0.4 | 0.4 |
| Barium Stearate (SB-410) | 0.6 | 0.6 | 0.6 | 0.6 | 0.6 |
| AC 1000 | 4 | 4 | 4 | 4 | 4 |
| Paraffin Oil | 5 | 5 | 5 | 5 | 5 |
| Irganox 1010 | 0.2 | 0.2 | 0.2 | 0 | 0 |

VERSIFY 2300, 2400 and 3401 are propylene-ethylene copolymers available from The Dow Chemical Company. Their MFR's are, respectively, 2, 2 and 8, and their densities are, respectively, 0.866, 0.859 and 0.863 g/cc.
PROPYLENE R370Y is a random polypropylene copolymer available from SK Corporation.
SEBS MD6945 is a styrene-ethylene-butene-styrene block copolymer available from Kraton.
DPO-BSA is 4,4'-oxydi-benzenesulfonylazide available from The Dow Chemical Company.
Zinc stearate SZ-210 is a foaming additive available from Songwon Industrial Co, Ltd.
Barium stearate SB-410 is a foaming additive available from Songwon Industrial Co, Ltd.
AC 1000 is a blowing agent comprising azodicarbonamide.
Paraffin Oil is HYDROBRITE 550 from Sonneborn, Inc. or similar oil.
IRGANOX 1010 is tetrakis [methylene (3,5-di-t-butyl-4-hydroxyhydrocinnamate)] available from BASF (Ciba).

Sample Preparation and Testing

The molecular melt comprises DPO-BSA and IRGANOX 1010 at a weight ratio of 1:3, and it is acquired as a pre-blended powder from The Dow Chemical Company. The MM is then ground into a fine powder. The ground MM and polymer pellets along with the other formulation components are added to a Haake mixer (Polylab OS Rheo Drive 7) at 150° C. and tumble blended for 5 minutes at a rotor speed of 40 revolutions per minute (rpm), then cooled to room temperature for microscopic observation. Small pieces are cut from the sample prepared in the Haake mixer and placed on a Hot Stage equipped with a microscope. The sample is heated from room temperature to 220° C. at a rate of 60° C. per minute and then held at 220° C. for foaming for up to 300 seconds.

Characterization

Optical Microscopy

In this experiment an optical microscope (Zeiss Z1.M compound research microscope) equipped with a Linkam FTIR 600 hot-stage was used to observe the foaming window and foam structure of the formulated compounds for a foam layer. An appropriate foaming window and foam structure are key requirements for the foaming performance of artificial leathers. Temperature and heating speed of the hot-stage is well controlled to best mimic the industrial foaming process (industrial foaming is conducted under a very fast heating speed to ensure most of the blowing agent is decomposed into gas within 30 s to 200 s at the foaming temperature). The real time images of the whole foaming process are recorded with a Zeiss AxioCam digital camera.

Rheology Testing

Melt viscosity in the foaming process is investigated by a Rheometer (ARES G2). Testing condition are strain of 5% and angular frequency of 6.28 rad/s.

Results

Foaming behavior of the compounds as prepared is observed under the microscope. FIG. 1 shows the foaming structure of the inventive and comparative examples as recorded at different foaming times from 120 s to 300 s. As can be clearly seen, all five samples after foaming for 120 s develop good foam structure. There is no apparent difference in foaming performance at short foaming periods. Cell sizes are around 50 to 500 microns in diameter.

After foaming more than 120 s at 220° C., however, an obvious difference is observed between the inventive examples and comparative examples. Comparative Example 1 comprising 20 wt % SEBS shows required foaming stability and is considered as a benchmark sample. Cells of Comparative Example 2 grew and combined into very large pores with size even larger than 1000 microns. For the three Inventive Examples, stability of the pores at the foaming temperature (220° C.) improves gradually with increased loading of the DPO-BSA coupling agent. There is significant improvement in the foam stability for Inventive Example 3 (with 1500 ppm BSA) compared to Comparative Example 2, and even better than the benchmark sample (Comparative Example 1). Even after foaming at 220° C. for up to 300 s, the foam structure of Inventive Example 3 is still well maintained. These results show that incorporation of certain levels of BSA into the formulation can greatly broaden the foaming window which is comparable or even better than the formulations comprising SEBS (Comparative Example 1).

Variation of melt viscosity in the foaming process for the Comparative Example 2 and Inventive Example 3 (with 1500 ppm BSA) is investigated by using Rheo-meter (ARES G2) to evaluate how BSA functioned in the process. The compounds prepared for this purpose are made following the same formulation as listed in Table 1 but without adding the blowing agent.

For the measurement of shear viscosity (DMS), samples are heated rapidly from 150° C. to 220° C. (foaming temperature) at 60° C./min and then kept at 220° C. for a certain period of time to simulate the actual foaming process. Test conditions are strain 5% and angular frequency 6.28 rad/s. Results are shown in FIG. 2. At the starting temperature (150° C.), viscosity of Comparative Example 2 and Inventive Example 3 are comparable, even though Inventive Example 3 comprises 1500 ppm DPO-BSA by melt mixing in the Haake for 5 minutes at 150° C. It indicates that the DPO-BSA has not fully reacted with the polymer since it has a long half-life of reaction at 150-160° C. It also confirms the combination of DPO-BSA MM with blowing agent as a foaming package does not have any obvious influence on compounding, calendaring and lamination in the artificial leather manufacturing process. Before the temperature reached 180° C., viscosity of Inventive Example 3 kept dropping which is desired for foaming (the blowing agent has started to decompose at this temperature). After that, viscosity of Inventive Example 3 started to increase, which showed the DPO-BSA MM started to react with the polymer composition. The increase of the viscosity helps to stabilize the foam structure of the composition. The reaction of the DPO-BSA MM with the polymer composition only takes about 60 s since DPO-BSA has a short half-life of reaction at the higher temperature. In contrast, viscosity of Comparative Example 2 dropped dramatically with an increase of temperature from ~7000 Pa·s (at 150° C.) directly to ~3000 Pa·s (at 220° C.) within 2 min. The results are consistent with the microscopy observation as shown in FIG. 1.

Extensional viscosity (EVF) of Comparative Example 2 and Inventive Example 3 is also measured. Tests are conducted at 150° C. and 220° C., respectively, with extension rate $0.1\ s^{-1}$. The comparative and inventive examples are both equilibrated at the designated temperature for more than 5 minutes before measuring. Results are shown in FIG. 3. As can be clearly seen, the viscosity of the Comparative Example is quite low and drops dramatically at a higher strain (>2). In contrast, the Inventive Example exhibits higher extensional viscosity and the stain hardening behavior due to reaction of BSA with the polymer. This is more obvious for the Inventive Example measured at 220° C. due to full reaction of BSA. These properties are helpful for achieving the required foaming properties.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

The invention claimed is:

1. A foamable composition comprising:
   (A) 5 to 95 weight percent propylene/ethylene copolymer based on the weight of the composition, the propylene/ethylene copolymer having a melt flow rate of 0.1 to 25 g/10 min, a molecular weight distribution of 3.5 or less,
   (B) 200 to 3,000 ppm molecular melt (MM) based upon the weight of the propylene/ethylene copolymer, the molecular melt (MM) comprising 4,4'-oxydi-benzenesulfonylazide (DPO-BSA) and an antioxidant, and
   (C) 1 to 30 weight percent blowing agent based upon the weight of the propylene/ethylene copolymer.

2. The foamable composition of claim 1 in which the propylene/ethylene copolymer has substantially isotactic propylene sequences.

3. The foamable composition of claim 1 in which the antioxidant is a hindered phenolic compound that does not contain phosphite containing a phosphorus atom in the +3 oxidation state, and the DPO-BSA and antioxidant are present in the molecular melt at mole ratio of 1:10 to 10:1.

4. The foamable composition of claim 3 in which the molecular melt comprises one or more of an internal lubricant, stabilizing agent, release agent, plasticizer, ultra-violet stabilizer and catalyst neutralizer.

5. The foamable composition of the claim 4 in which the blowing agent is azodicarbonamide.

6. A process for preparing a foam made from the foamable composition of claim 1, the process comprising the steps of:
   (A) blending a DPO-BSA molecular melt, blowing agent, and propylene/ethylene copolymer;
   (B) compounding the blend at a temperature at which the copolymer is melted but neither the blowing agent nor DPO-BSA are activated, and
   (C) raising the temperature of the composition such that the blowing agent and DPO-BSA are activated sufficient to foam the composition.

7. The process of claim 6 in which the blending and compounding steps are conducted at a temperature of 150° C. or less, and the foaming step of (C) is conducted at a temperature above 150° C. but less than 220° C.

8. Artificial leather comprising foam made by the process of claim 7.

* * * * *